(12) United States Patent
Burgess

(10) Patent No.: US 8,196,931 B2
(45) Date of Patent: Jun. 12, 2012

(54) GAP MOLDING AND METHOD

(76) Inventor: David James Burgess, Woodland Park, CO (US)

( * ) Notice: Subject to any disclaimer, the term of this patent is extended or adjusted under 35 U.S.C. 154(b) by 256 days.

(21) Appl. No.: 12/685,762

(22) Filed: Jan. 12, 2010

(65) Prior Publication Data

US 2010/0176560 A1  Jul. 15, 2010

Related U.S. Application Data

(60) Provisional application No. 61/144,921, filed on Jan. 15, 2009.

(51) Int. Cl.
*F16J 15/02* (2006.01)
*A47B 13/08* (2006.01)
*E04C 2/38* (2006.01)
*A47B 96/18* (2006.01)

(52) U.S. Cl. .......... 277/312; 277/637; 277/642; 108/90; 52/716.4; 312/140.1

(58) Field of Classification Search ............... 277/630, 277/637, 642, 312; 312/140.1, 140.3; 52/716.4; 108/90; 297/182
See application file for complete search history.

(56) References Cited

U.S. PATENT DOCUMENTS

| | | | | |
|---|---|---|---|---|
| 2,705,820 A * | 4/1955 | Torrence | ...... | 52/782.2 |
| 2,888,684 A * | 6/1959 | Icenhower | ...... | 52/716.1 |
| 3,446,201 A * | 5/1969 | More | ...... | 126/39 R |
| 3,822,858 A * | 7/1974 | Franklin | ...... | 249/194 |
| 3,885,371 A * | 5/1975 | Oakes | ...... | 52/475.1 |
| 4,308,309 A * | 12/1981 | Frosch et al. | ...... | 428/193 |
| 4,857,668 A * | 8/1989 | Buonanno | ...... | 174/354 |
| 5,026,595 A * | 6/1991 | Crawford et al. | ...... | 428/193 |
| 5,429,844 A * | 7/1995 | Galardi | ...... | 428/31 |
| 5,470,422 A * | 11/1995 | Gold | ...... | 156/108 |
| 5,518,309 A * | 5/1996 | St-Pierre | ...... | 312/140.4 |
| 5,678,380 A * | 10/1997 | Azzar | ...... | 52/716.4 |
| 7,140,206 B2 * | 11/2006 | Braun et al. | ...... | 68/3 R |
| 7,784,238 B2 * | 8/2010 | Bannister | ...... | 52/465 |
| 2004/0040160 A1 * | 3/2004 | Cohen et al. | ...... | 30/169 |
| 2007/0134457 A1 * | 6/2007 | Dobelle | ...... | 428/36.9 |

* cited by examiner

*Primary Examiner* — Vishal Patel
(74) *Attorney, Agent, or Firm* — Snell & Wilmer L.L.P.

(57) ABSTRACT

A gap molding and associated methods reduce accumulation of undesirable material in a gap. A gap molding comprises a top portion configured to at least partially bridge a gap, and a retention portion configured to frictionally engage with at least one side of the gap. The gap molding may be configured with a taper in order to smoothly transition from the surfaces on either side of the gap. The gap molding may comprise silicone or other suitable material. The gap molding may desirably be placed between appliances, countertops, and/or the like in order to provide improved aesthetics and/or reduce accumulation of food waste and other debris.

23 Claims, 9 Drawing Sheets

GAP MOLDING AND METHOD

CROSS REFERENCE TO RELATED APPLICATIONS

This application is a non-provisional of U.S. Provisional No. 61/144,921 filed on Jan. 15, 2009 and entitled "METHODS AND SYSTEMS FOR GAP MOLDING." The entire contents of this application are hereby incorporated by reference.

TECHNICAL FIELD

The present disclosure relates to appliances and cabinetry and particularly to gap moldings for the same.

BACKGROUND

Most homes have a free-standing kitchen range (stove/oven) and/or other appliances. These appliances come in a variety of shapes, configurations and sizes. For example, not all kitchen ranges are exactly the same size. Openings in cabinetry for appliances are often referred to as "appliance cutouts." Many home builders attempt to accommodate variety in appliance dimensions by building the appliance cutouts slightly larger than an "average" width to allow for extra clearance, so that the appliance can be easily moved into place. Consequently, the cutout is slightly larger than the appliance. Therefore, once the appliance is slid into place, there is often a gap between the edge of the appliance and the edge of the cabinets and/or countertop adjacent the cutout.

Moreover, since areas near the kitchen stove are where frequent food preparation takes place, this is also an area where substantial spillage occurs. Additionally, in these areas food crumbs and other debris tend to be shed during preparation. A substantial amount of this debris inadvertently ends up dripping down the sides and/or in between the aforementioned gap, with much deposited on the floor below. Because the gap is often deep and/or narrow, access for cleaning this debris is difficult. Accumulation of debris produces a less than sanitary environment around the stove, and encourages insect and rodent populations by providing them a food source.

SUMMARY

This disclosure relates to systems and methods for gap moldings. In an exemplary embodiment, a gap molding comprises a top portion configured to at least partially bridge a gap between a first surface and a second surface, and a retention portion coupled to the top portion. The retention portion comprises a first contact portion, a second contact portion, and a tension portion disposed between the first contact portion and the second contact portion. The tension portion is configured to force the first contact portion and the second contact portion to frictionally retain the gap molding in the gap.

In another exemplary embodiment, a method for providing a gap molding between at least one of an appliance and a countertop comprises providing a top portion having a tapered edge, providing a retention portion configured to frictionally engage a gap, coupling the top portion to the retention portion to form a gap molding, and inserting the gap molding at least partially into the gap.

The contents of this summary section are provided only as a simplified introduction to the disclosure, and are not intended to be used to limit the scope of the appended claims.

BRIEF DESCRIPTION OF THE DRAWINGS

With reference to the following description, appended claims, and accompanying drawings:

DETAILED DESCRIPTION

The following description is of various exemplary embodiments only, and is not intended to limit the scope, applicability or configuration of the present disclosure in any way. Rather, the following description is intended to provide a convenient illustration for implementing various embodiments including the best mode. As will become apparent, various changes may be made in the function and arrangement of the elements described in these embodiments without departing from the scope of the present disclosure.

For the sake of brevity, conventional techniques for cabinetry, appliance installation and/or configuration, fabrication, molding, and the like may not be described in detail herein. Furthermore, the connecting lines shown in various figures contained herein are intended to represent exemplary functional relationships and/or physical couplings between various elements. It should be noted that many alternative or additional functional relationships and/or physical connections may be present in a practical gap molding.

Various exemplary embodiments and aspects thereof may be described herein in terms of various structural components, functional components, and/or processing steps. It should be appreciated that such functional components may be realized by any number of hardware or structural components configured to perform the specified functions. For example, various exemplary embodiments may employ various alloys, rubbers, plastics, composites, fasteners, adhesives, and/or the like whose structure and composition may be suitably configured for various intended purposes. In addition, various exemplary embodiments may be utilized in any suitable structural application where gaps are encountered, and the appliance gap examples illustrated herein are merely for exemplary purposes.

Figure 1A:
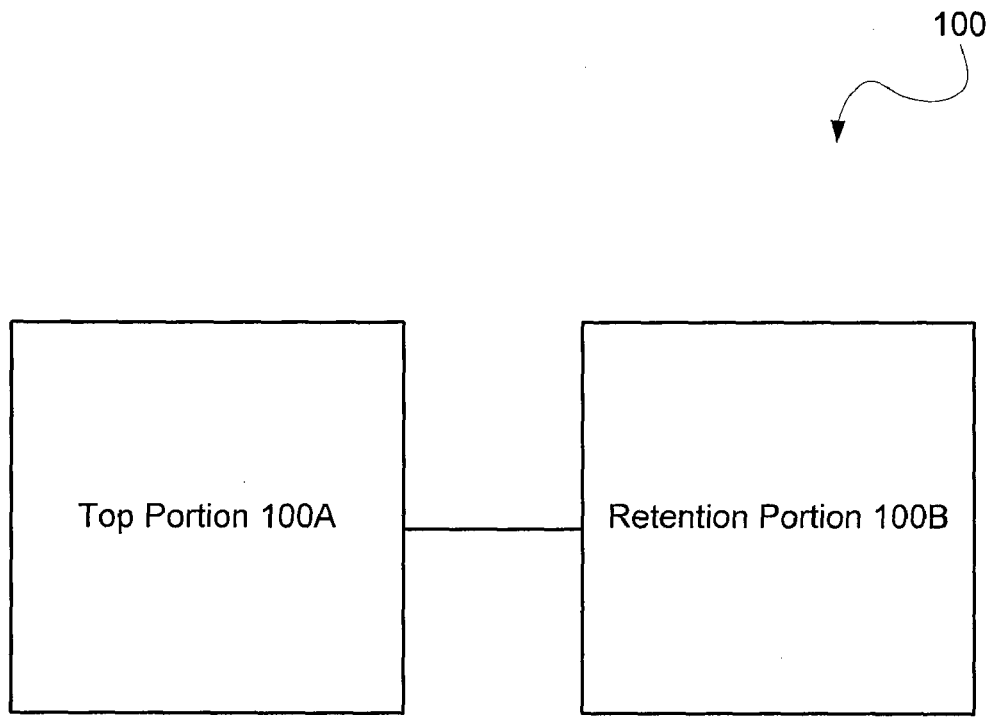
FIG. 1A illustrates a block diagram of a gap molding in accordance with an exemplary embodiment.

In accordance with an exemplary embodiment, and with reference to FIG. 1A, a gap molding 100 generally comprises a top portion 100A and a retention portion 100B. Top portion 100A may comprise any suitable structures, materials, dimensions, geometries, and/or the like configured to at least partially bridge a gap, for example a gap between an appliance and a countertop. Retention portion 100B may comprise any suitable structures, materials, dimensions, geometries, and/or the like configured to frictionally engage one or more surfaces in order to retain gap molding 100 in place. Top portion 100A is coupled to retention portion 100B

Figure 1B:
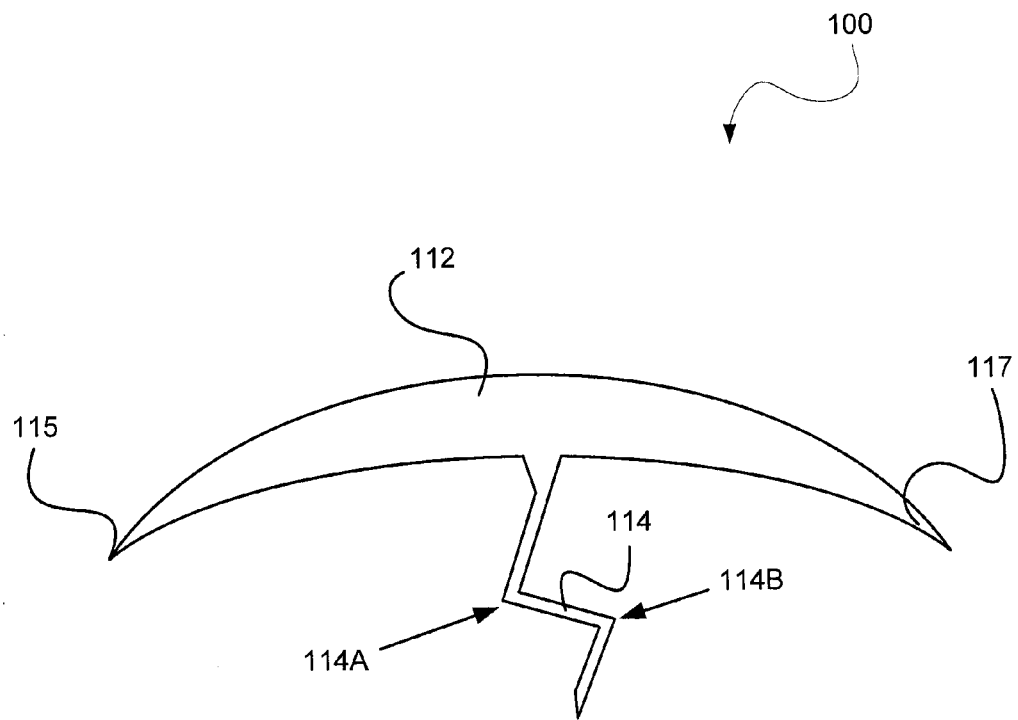
FIG. 1B illustrates a cross-section of a gap molding in accordance with an exemplary embodiment.

In accordance with various exemplary embodiments, and with reference now to FIG. 1B, a side view is shown of exemplary gap molding 100 comprising top portion 100A (for example, top portion 112) and retention portion 100B (for example, retention portion 114). Gap molding 100 may be monolithic (e.g., top portion 112 and retention portion 114 may be formed from a single piece of material). Top portion 112 and retention portion 114 may also comprise separate components coupled together to form gap molding 100. In general, gap molding 100 and/or components thereof may comprise any suitable material configured to aid in customizing and/or maintaining a particular angle or shape, and/or to mold around obstacles or deficiencies which may exist between items being bridged together by gap molding 100.

Top portion 112 may comprise any suitable structures, materials, dimensions, geometries, and/or the like configured to at least partially bridge a gap, for example a gap between an appliance and a countertop. In accordance with an exemplary embodiment, top portion 112 is configured with a suitably selected size and shape. Such size and shape can comprise any width, length, and/or depth, as well as any other suitable shapes, dimensions, and/or geometries. For example, top portion 112 may comprise dome-shaped configurations, umbrella shaped configurations, tapered configurations, curvilinear configurations, angled configurations, and/or any other suitable configurations, for example configurations intended for placement between various kitchen countertops, cabinets, appliances, and/or the like. Moreover, top portion 112 may be configured to bridge gaps having multiple dimensions, for example gaps between appliances, countertops, and the like. For example, with momentary reference to FIG. 1B, top portion 112 may be configured to taper at a first height on a first side, and to taper at a second height on a second side, for example in order to bridge a gap between a countertop and an appliance having different heights from the floor.

In accordance with various exemplary embodiments, top portion 112 comprises a semi-rigid material. In other exemplary embodiments, top portion 112 comprises a flexible material. In yet other exemplary embodiments, top portion 112 comprises a rigid material. In an exemplary embodiment, top portion 112 comprises a waterproof, oil-resistant, heat-resistant and durable material configured to tolerate common kitchen cleaners and cleaning methods. In various exemplary embodiments, top portion 112 comprises one or more of rubber, silicone, nitrile, neoprene, and/or polyethylene, polyvinylchloride, polypropylene, nylon and/or carbon fiber. In certain exemplary embodiments, top portion 112 comprises an integrated, malleable endoskeleton comprised of aluminum, copper or other malleable metals. In yet other exemplary embodiments, top portion 112 comprises one or more of stainless steel, steel, titanium, iron, brass, bronze, copper, aluminum, or other suitable metallic substance, including precious metals. Moreover, top portion 112 may comprise a combination of any or all of the above noted and similar materials. In general, top portion 112 may comprise any suitable structure and/or materials configured to at least partially bridge, occupy, obscure, and/or otherwise fill and/or obstruct a gap.

In accordance with various exemplary embodiments, top portion 112 further comprises outer edges 115 and 117. Outer edges 115 and 117 may be tapered, for example in order to provide a comparatively smooth "windshield wiper" effect where outer edges 115 and/or 117 abut and/or otherwise substantially contact or mate with other surfaces, for example countertop surfaces, appliance surfaces, and/or the like. In this manner, wiping and/or otherwise cleaning between items bridged by gap molding 100 is facilitated, because outer edges 115 and/or 117 create a smooth transition therebetween. For example, debris and waste particles accumulated on a particular surface (for example, a countertop, a stovetop, and/or the like) may be easily wiped across top portion 112, and/or guided (for example, horizontally) along outer edges 115 and/or 117, with minimal debris ending up beneath edges 115 and 117. Outer edges 115 and 117 may also be curved, angled, and/or otherwise shaped and/or formed, as desired. Additionally, top portion 112 may be configured with a trough-like shape, for example in order to direct the accumulation of particles and substances into the trough.

Top portion 112 may comprise various thicknesses, for example between about 1" to about 0.01". However, thinner and/or thicker material may be used as appropriate. Moreover, top portion 112 may be configured with a particular thickness in a certain location, and a different thickness in another location. For example, top portion 112 may taper, with the thickest area of top portion 112 located at the area of intersection with retention portion 114. Additionally, top portion 112 may comprise a single layer material, multiple layers of the same material, multiple layers of different materials, or any combination of the same.

Moreover, top portion 112 may be configured with various colors, patterns, and/or materials, as desired. For example, in various exemplary embodiments top portion 112 is configured with material having a similar color as a desired appliance in order to at least partially match the appliance in appearance.

Top portion 112 may be formed via any suitable method and/or process, for example by extrusion, molding, and/or the like. Top portion 112 may be configured with a "universal" design suitable for bridging a variety of gaps, for example horizontal gaps between about 1/32" and about 6" in width, and between about 1" and about 120" in length.

Figure 1C:
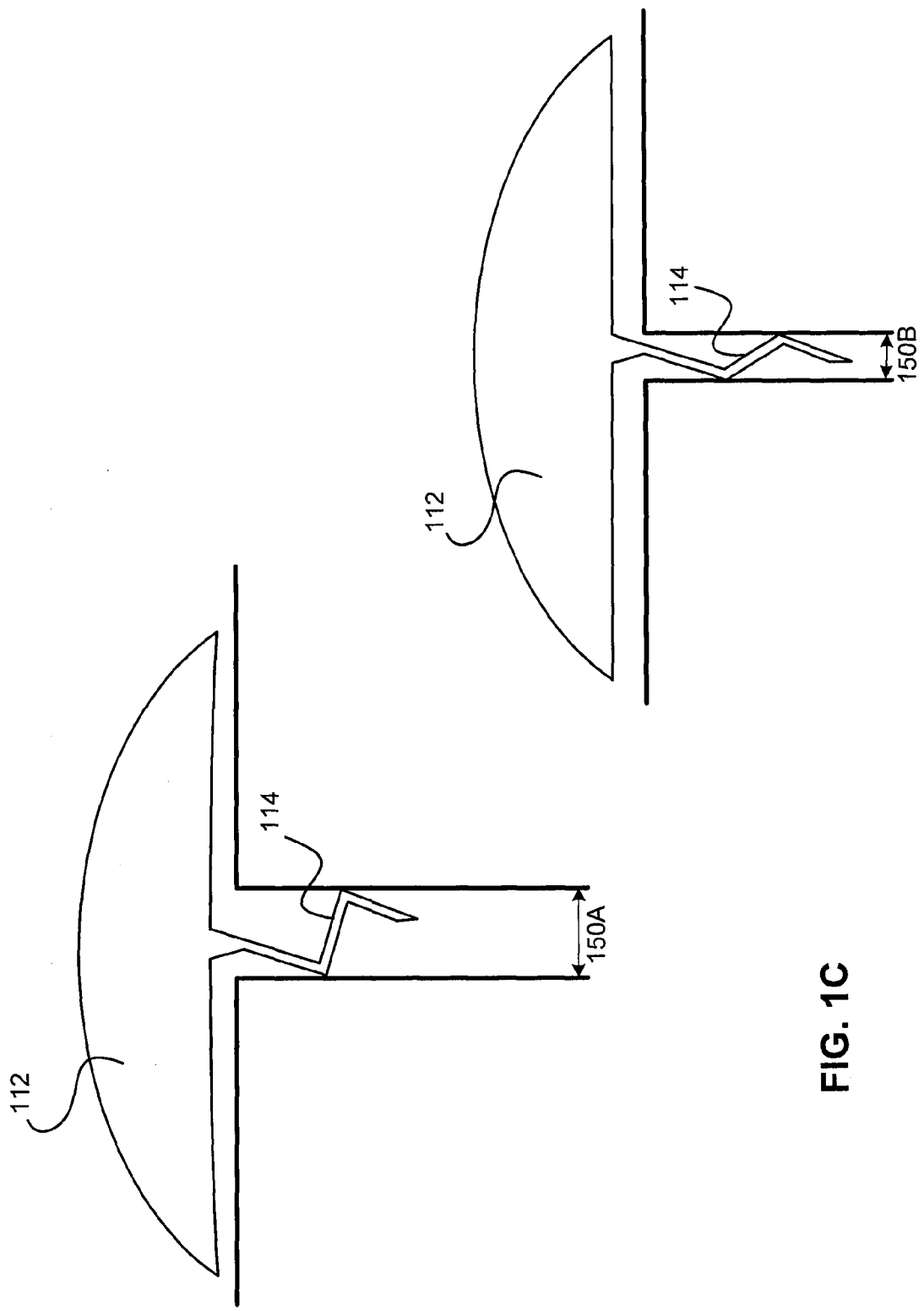
FIG. 1C illustrates a gap molding partially inserted into gaps of differing widths in accordance with an exemplary embodiment.
Figure 1D:
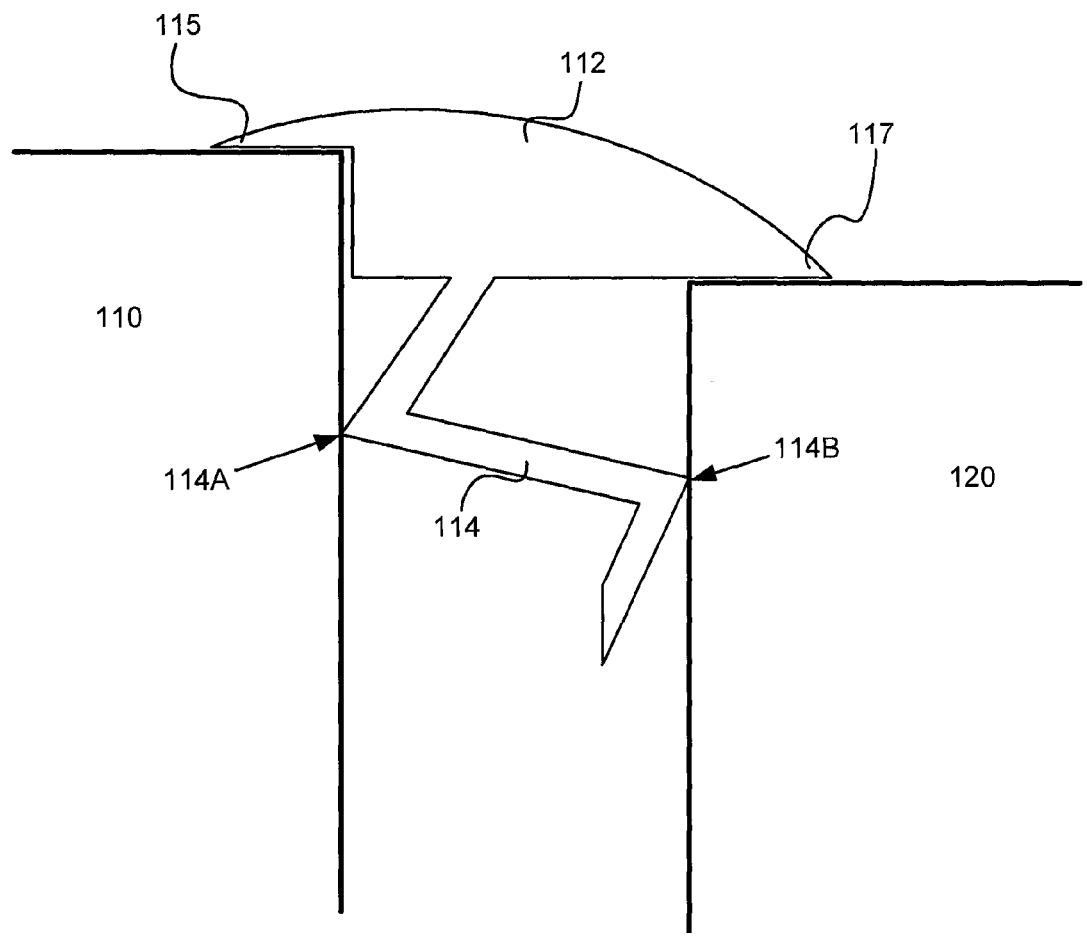
FIG. 1D illustrates a cross-section of a gap molding configured to bridge a gap having edges with dissimilar heights in accordance with an exemplary embodiment.
Figure 1E:
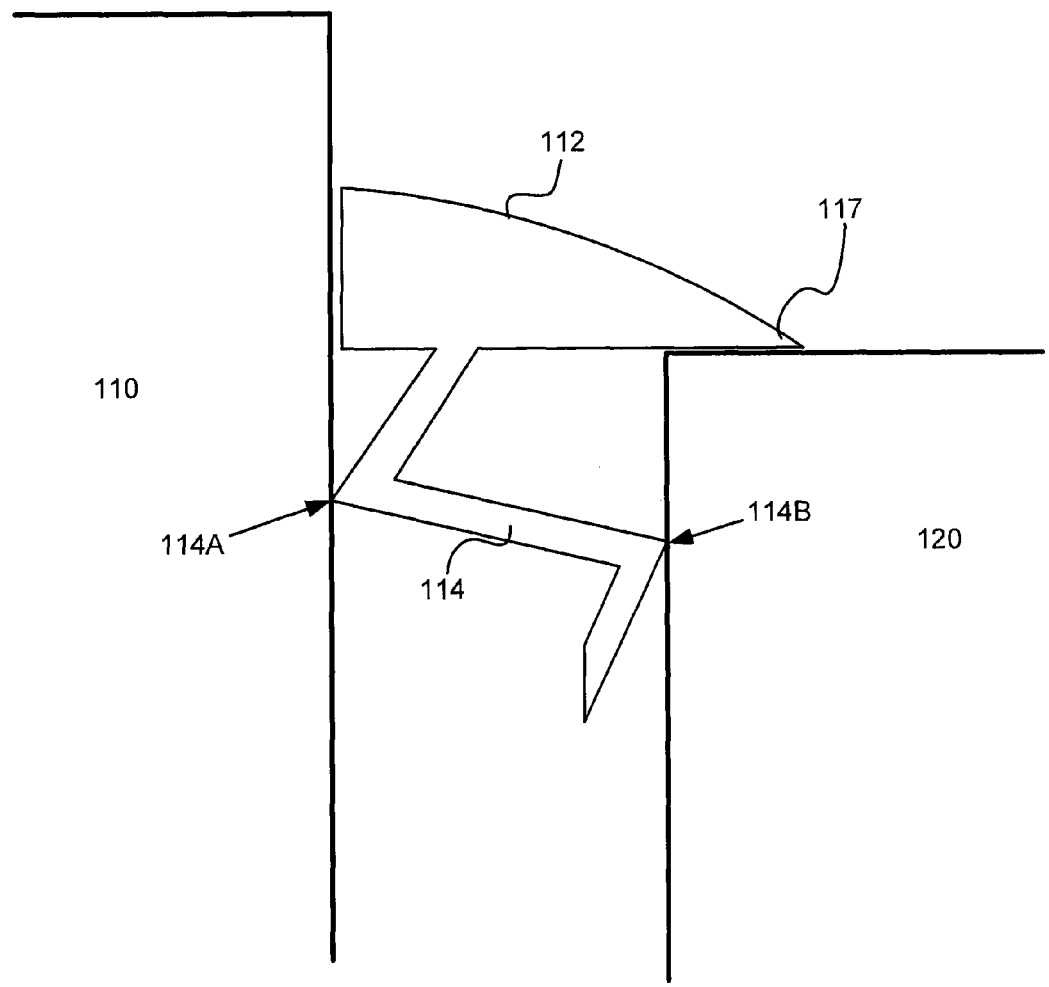
FIG. 1E illustrates a cross-section of a gap molding configured to bridge a gap having edges with dissimilar heights in accordance with an exemplary embodiment.

With momentary reference to FIGS. 1D and 1E, in various exemplary embodiments top portion 112 is configured and/or customized to bridge a particular gap, for example a gap between a stovetop and a countertop having a height differential, such as a differential of one inch or more. In certain exemplary embodiments, top portion 112 extends over both sides of the gap. In other exemplary embodiments, top portion 112 extends over one side of the gap and abuts the other side of the gap. In this manner, gap molding 100 may be configured to at least partially bridge a gap between objects having any dissimilar height. Moreover, top portion 112 may be configured to bridge any suitable gap between appliances, cabinetry, countertops, and/or the like, as desired.

In various exemplary embodiments, top portion 112 is coupled to retention portion 114 in order to retain gap molding 100 in a desired location.

Figure 1F:
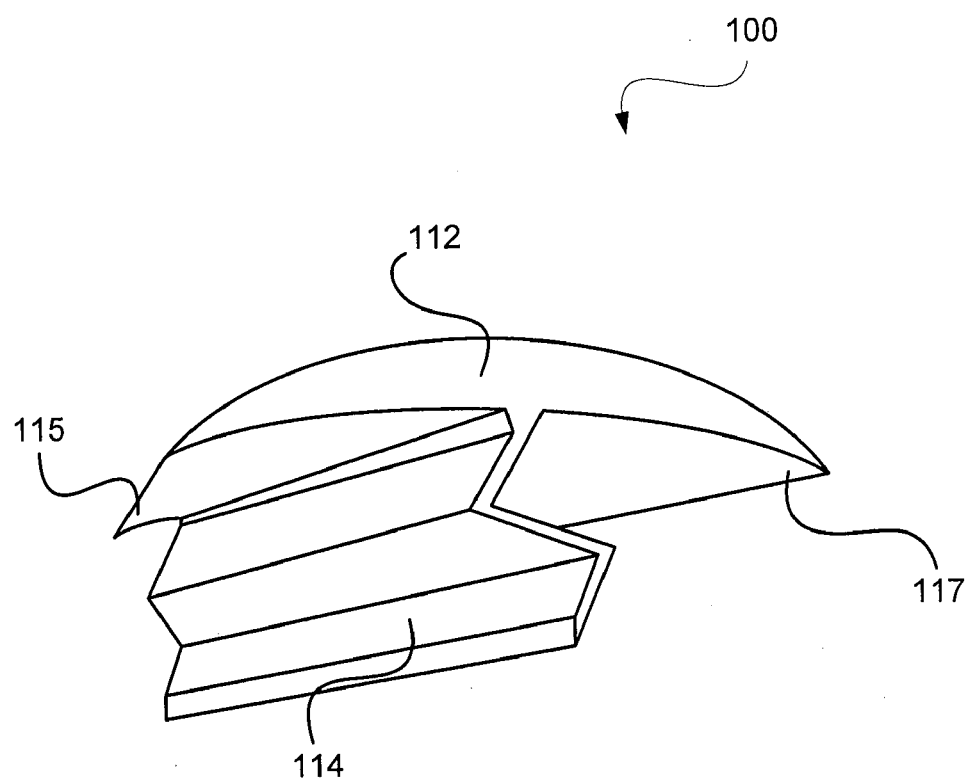
FIG. 1F illustrates a perspective view of a gap molding in accordance with an exemplary embodiment.
Figure 1G:
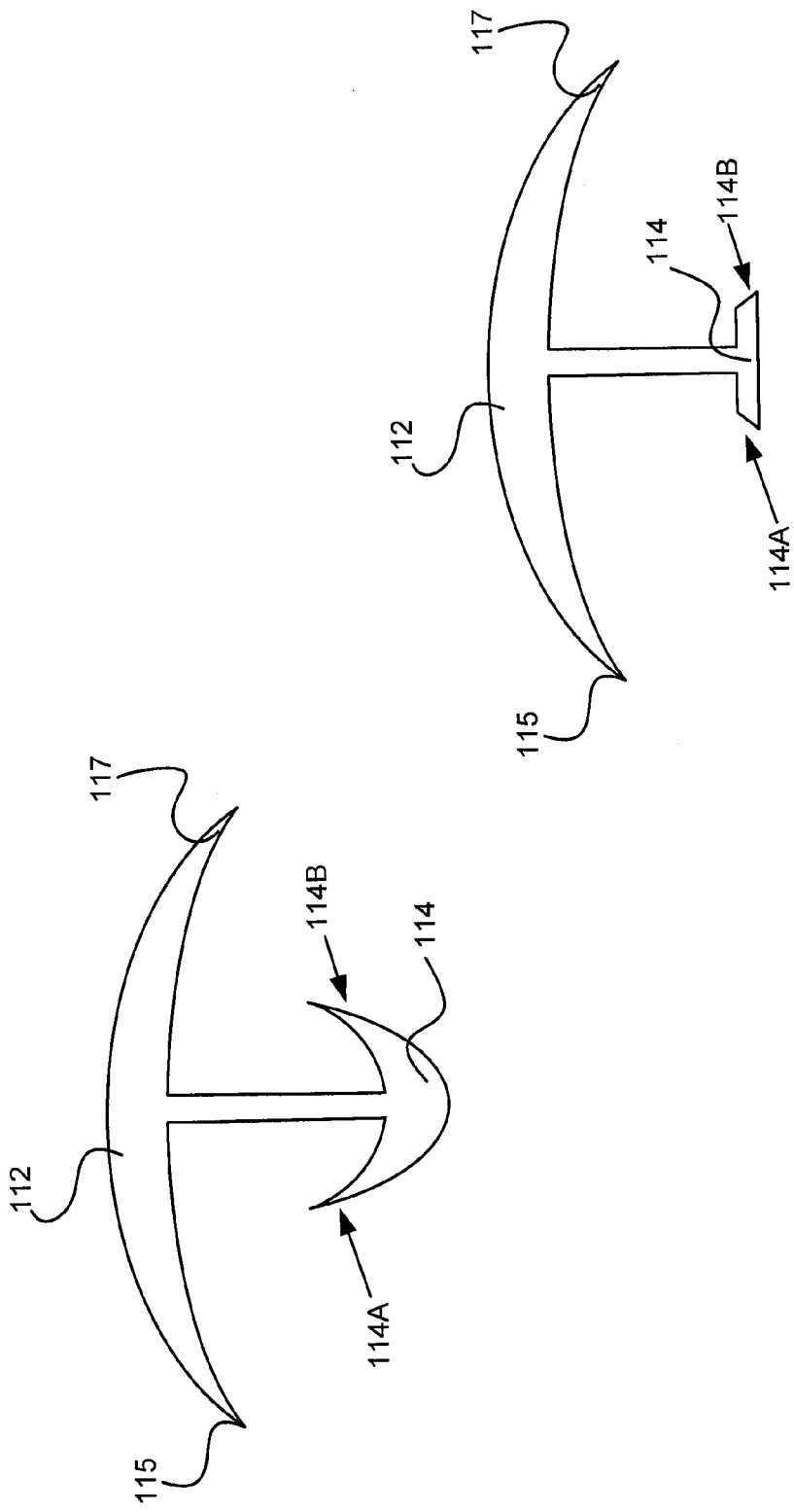
FIG. 1G illustrates various configurations of gap moldings in accordance with an exemplary embodiment.

With continued reference to FIG. 1B, and in accordance with an exemplary embodiment, retention portion 114 is coupled to top portion 112. Retention portion 114 may comprise any suitable structures, materials, dimensions, geometries, and/or the like configured to frictionally engage one or more surfaces in order to retain gap molding 100 in place. Retention portion 114 is configured with a desired size and shape. Such size and shape can comprise any width, length, and/or depth, as well as any other suitable shapes, dimensions, and/or geometries. With momentary reference to FIGS. 1B and 1F, in various exemplary embodiments, retention portion 114 may comprise a "Z" shape, a "T" shape, a splitwalled diamond shape, an inverted mushroom shape, a vertical shape with one or more horizontal bristles, a vertical shape with one or more protruding barbs, and/or the like. Moreover, retention portion 114 may comprise any suitable shape configured to exert a tension force responsive to compression and/or other deformation of retention portion 114.

In accordance with various exemplary embodiments, retention portion 114 comprises a semi-rigid material. In other exemplary embodiments, retention portion 114 comprises a flexible material. In yet other exemplary embodiments, retention portion 114 comprises a rigid material. In an exemplary embodiment, retention portion 114 comprises a flexible material configured to frictionally engage the side of an appliance and a kitchen cabinet. In various exemplary embodiments, retention portion 114 comprises one or more of rubber, silicone, nitrile, neoprene, and/or polyethylene, polyvinylchloride, polypropylene, nylon and/or carbon fiber. In certain exemplary embodiments, retention portion 114 comprises an integrated, malleable endoskeleton comprised of aluminum, copper or other malleable metals. In yet other exemplary embodiments, retention portion 114 comprises one or more of stainless steel, steel, titanium, iron, brass, bronze, copper, aluminum, or any other suitable metallic substance, including precious metals. Moreover, retention portion 114 may comprise a combination of any or all of the above noted and similar materials. In general, retention portion 114 may comprise any suitable structure and/or materials configured to at least partially secure gap molding 100 in a desired location.

Retention portion 114 may comprise various thicknesses, for example between about 0.02" to about 0.50". However, thinner and/or thicker material may be used as appropriate. Moreover, retention portion 114 may comprise a particular thickness in a certain location, and a different thickness in another location. For example, retention portion 114 may taper, with the thickest area of retention portion 114 located at the area of intersection with top portion 112. Additionally, retention portion 114 may comprise a single layer material, multiple layers of the same material, multiple layers of different materials, or any combination of the same.

Additionally, retention portion 114 may comprise a particular material in a certain location, and a different material in another location. For example, sections of retention portion 114 configured to frictionally engage the sidewalls of a gap (for example, first contact portion 114A, second contact portion 114B, and/or the like) may comprise a material having a high frictional coefficient. Other sections of retention portion 114 may comprise a material capable of exerting a spring-like force, for example a metal. In this manner, retention portion 114 may be configured to be secured in a desired location, for example responsive to compression and/or other deformation of retention portion 114. Moreover, retention portion 114 may comprise any number of components configured to frictionally engage the sidewalls of a gap, and any number of components capable of exerting a spring-like force or other force, as desired.

Retention portion 114 may be formed via any suitable process or method, for example by extrusion, molding, and/or the like. Retention portion 114 may be configured with a "universal" design suitable to come into contact with and/or frictionally adhere to the sidewalls of a variety of gaps, for example horizontal gaps between about 1/32" and about 6" in width. Retention portion 114 may also be configured to come into contact with and/or frictionally engage sidewalls of a particular gap, for example a gap having a fixed width and/or known sidewall materials. Moreover, retention portion 114 may be configured to secure gap molding 110 at least partially within any suitable gap between appliances, cabinetry, countertops, and/or the like, as desired.

In various exemplary embodiments, retention portion 114 is configured to be adjustable to fit within a variety of gaps. With momentary reference to FIG. 1C, retention portion 114 configured with a "Z"-shape may expand and/or compress, for example in an accordion-like manner, in order to suitably fit within and/or frictionally engage multiple gaps, each gap having a different width. For example, a particular retention portion 114 may frictionally engage the walls of a first gap having width 150A. The same retention portion 114 may be configured to suitably frictionally engage the walls of a second gap having a narrower width 150B. In this manner, a single retention portion 114 may be utilized to engage the walls of a variety of gaps. In various exemplary embodiments, a particular retention portion 114 is configured to frictionally engage the walls of gaps ranging in width from 1/8 inch to 2 inches. In other exemplary embodiments, a particular retention portion 114 is configured to frictionally engage the walls of gaps ranging in width from 1/4 inch to 3 inches. Moreover, retention portion 114 may be configured to frictionally engage the walls of gaps having any suitable range of widths, as desired. Additionally, retention portion 114 may be configured to be adjustable to fit within and/or frictionally engage the sides of a gap having varying widths.

Top portion 112 and retention portion 114 may be coupled to one another, for example by gluing, fastening, welding, and/or otherwise bonding and/or securing, as desired. Although top portion 112 and retention portion 114 are described as being formed separately, it should be noted that top portion 112 and retention portion 114 may be formed together. For example, top portion 112 and retention portion 114 may be formed via pressure extrusion, vacuum extrusion, casting, poured molding, compression molding, injection molding, die-cut blanking, and/or the like. Moreover, components of gap molding 100, for example top portion 112 and/or retention portion 114, may be formed via any suitable method and/or out of any suitable material, as desired.

Gap molding 100 may be cut, trimmed, sized, and/or otherwise configured, as desired. For example, gap molding 100 may be formed as a line of extruded material, which may be repeatedly sliced crosswise and/or otherwise severed to form multiple individual gap moldings 100, each having a desired length. Moreover, gap molding 100 may be processed and customized in any suitable manner, as desired.

Figure 2:
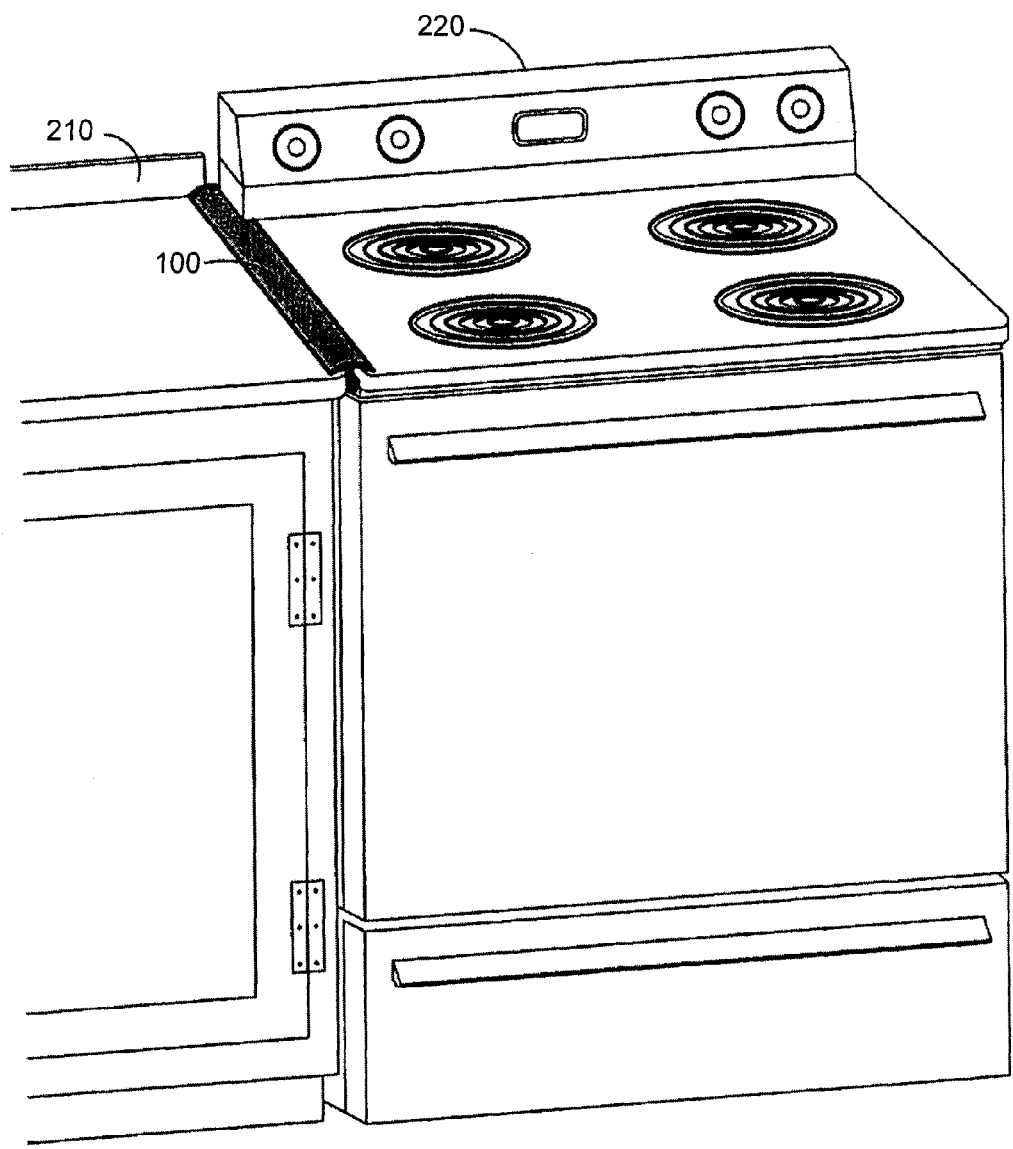
FIG. 2 illustrates a gap molding placed between a kitchen range and a countertop in accordance with an exemplary embodiment.
Figure 3:
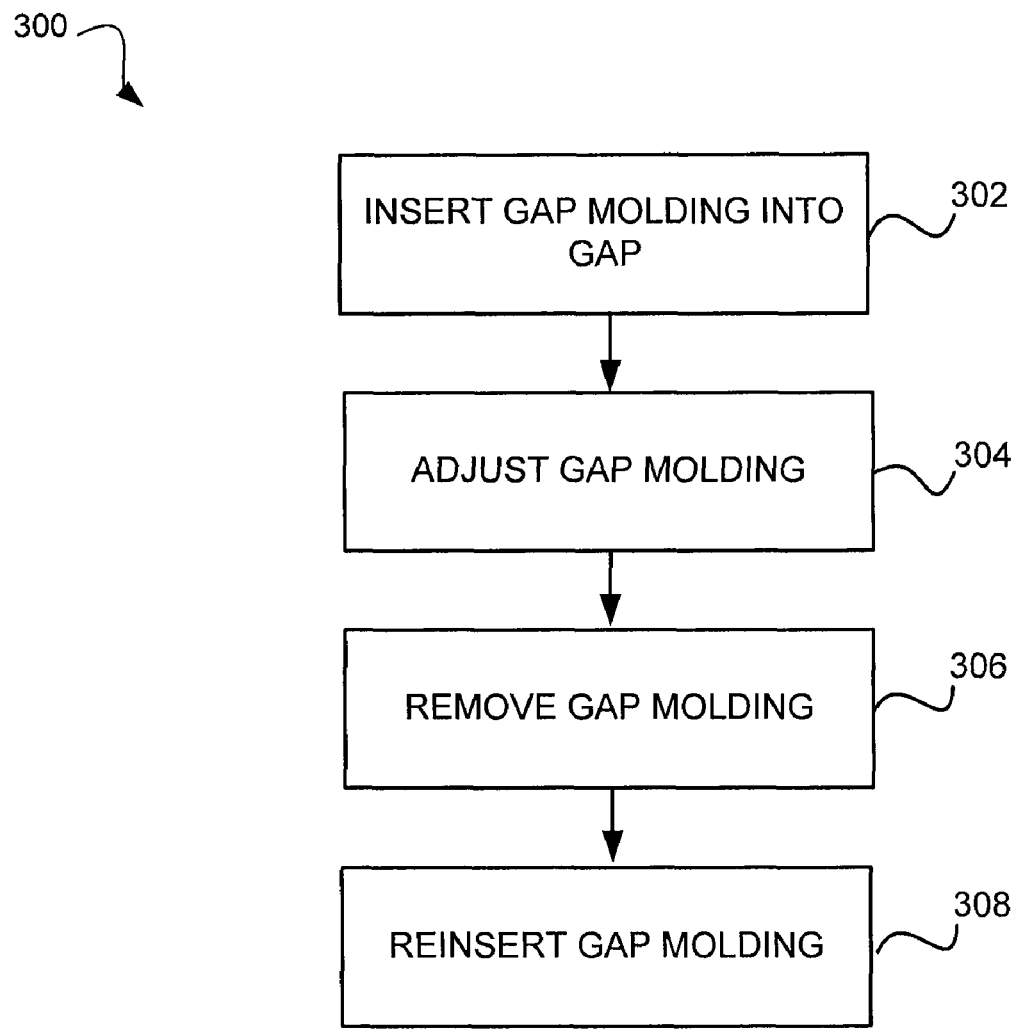
FIG. 3 illustrates a method of providing a gap molding in accordance with an exemplary embodiment.

In accordance with an exemplary embodiment, and with reference now to FIG. 3, a method 300 for providing and/or utilizing gap molding 100 is illustrated, as follows:

Once formed, shaped, cut, sized, and/or otherwise configured, gap molding 100 may be placed into a desired gap (step 302), for example a gap between a countertop and a stovetop. Retention portion 114 is thus wedged in place and frictionally retains gap molding 100 in place by contact with the sides of the gap. Further force and/or guidance may be applied to gap molding 100 once inserted into the gap, for example in order to further adjust or fine-tune the positioning of gap molding 100 (step 304). With momentary reference to FIG. 2, in an exemplary embodiment gap molding 100 is configured to fit into the gap between a countertop 210 and a stove 220. In this embodiment, gap molding 100 covers the gap from the front of the stove 220 and countertop 220 to the backsplash or rear wall.

When gap molding 100 is in place, debris is at least partially prevented from falling into and/or otherwise entering the gap due to the presence of gap molding 100. Additionally, gap molding 100 may at least partially obscure the gap for improved aesthetics. In this manner, gap molding 100 reduces and/or eliminates the accumulation of dirt, grease, grime, food particles, and/or other debris in the gap, as well as accumulation of such on the floor below the gap. By reducing and/or eliminating this accumulation, gap molding 100 reduces and/or minimizes a food source for potentially harmful insects and rodents, resulting in a more sanitary environment. Additionally, installation of gap molding 100 may provide a more uniform, integrated appearance between the appliance(s) and countertops and/or cabinets, for example by providing a common color.

If desired, gap molding 100 may be removed from the gap (step 306). Gap molding 100 may be pushed, pulled, and/or otherwise forced from and/or ejected from the gap. Gap molding 100 may be removed in order to allow an appliance to be moved, for example for servicing, for installation of a new appliance, and/or the like. Gap molding 100 may also be replaced, reinserted, and/or otherwise reused after removal (step 308), as desired.

While gap molding 100 has been illustrated, in various exemplary embodiments, for use between a stove and countertop, gap molding 100 may suitably be used to at least partially bridge and/or seal a gap between any suitable structures, cabinets, and/or appliances, and/or any other areas where dirt and debris are unwanted or cleaning may be involved and difficult, and/or where a more integrated appearance may be desired (for example, between a washer and dryer).

While the principles of this disclosure have been shown in various embodiments, many modifications of structure, arrangements, proportions, the elements, materials and components, used in practice, which are particularly adapted for a specific environment and operating requirements may be used without departing from the principles and scope of this disclosure. These and other changes or modifications are intended to be included within the scope of the present disclosure and may be expressed in the following claims.

In the foregoing specification, various concepts have been described with reference to various embodiments. However, one of ordinary skill in the art appreciates that various modifications and changes can be made without departing from the scope of the present disclosure. Accordingly, the specification is to be regarded in an illustrative rather than a restrictive sense, and all such modifications are intended to be included within the scope of the present disclosure. Likewise, benefits, other advantages, and solutions to problems have been described above with regard to various embodiments. However, benefits, advantages, solutions to problems, and any element(s) that may cause any benefit, advantage, or solution to occur or become more pronounced are not to be construed as a critical, required, or essential feature or element of any or all of the claims. As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

Also, as used herein, the terms "coupled," "coupling," or any other variation thereof, are intended to cover a physical connection, an electrical connection, a magnetic connection, an optical connection, a communicative connection, a functional connection, and/or any other connection. When language similar to "at least one of A, B, or C" is used in the claims, the phrase is intended to mean any of the following: (1) at least one of A; (2) at least one of B; (3) at least one of C; (4) at least one of A and at least one of B; (5) at least one of B and at least one of C; (6) at least one of A and at least one of C; or (7) at least one of A, at least one of B, and at least one of C.

What is claimed is:

1. An assembly having a gap molding placed between a first and a second surface, comprising:
    a top portion at least partially bridging a gap between the first surface and the second surface; and
    a retention portion coupled to the top portion, the retention portion comprising:
        a first contact portion frictionally engaging a first side of the gap;
        a second contact portion frictionally engaging a second side of the gap different from the first side; and
        a bending portion disposed between the first contact portion and the second contact portion, wherein the bending portion forces the first contact portion and the second contact portion to frictionally retain the gap molding in the gap,
    wherein the retention portion is configured with a Z shape in cross section;
    wherein the first contact portion is disposed at a first corner of the Z shape,
    wherein the second contact portion is disposed at a second corner of the Z-shape, and
    wherein the retention portion is coupled to the top portion at a terminal end of the Z shape.

2. The assembly of claim 1, wherein the retention portion is configured to expand in an accordion-like manner.

3. The assembly of claim 2, wherein the first contact portion and the second contact portion comprise a different material than the material comprising the tension bending portion.

4. The assembly of claim 1, wherein the top portion comprises silicone and the retention portion comprises metal.

5. The assembly of claim 1, wherein the top portion and the retention portion are monolithic.

6. The assembly of claim 1, wherein the first surface is a countertop.

7. The assembly of claim 5, wherein the second surface is a stovetop.

8. The assembly of claim 1, wherein the first surface and the second surface differ in height.

9. The assembly of claim 8, wherein the top portion is configured to smoothly transition from the first surface.

10. The assembly of claim 1, wherein the gap is located between two appliances.

11. The assembly of claim 1, wherein the gap molding comprises a metal endoskeleton covered with silicone.

12. The assembly of claim 1, wherein the first contact portion contacts the first side of a first depth, and wherein the second contact portion contacts the second side at a second depth different than the first depth.

13. The assembly of claim 12, wherein the first contact portion contacts the first side along the entire length of the gap molding, and wherein the second contact portion contacts the second side along the entire length of the gap molding.

14. The assembly of claim 1, wherein the gap molding is configured to reduce the amount of debris entering the gap.

15. The assembly of claim 1, wherein the top portion is configured with a trough-like shape to capture debris from at least one of the first surface or the second surface.

16. A method for providing a gap molding between a first surface and a second surface, the method comprising:
    providing a top portion having a tapered edge;
    providing a retention portion frictionally engaging a gap between the first surface and the second surface;

coupling the top portion to the retention portion to form a gap molding; and inserting the gap molding at least partially into the gap, wherein the retention portion is configured with a Z shape in cross section, wherein the retention portion comprises a first contact portion disposed at a first corner of the Z shape, wherein the retention portion comprises a second contact portion disposed at a second corner of the Z shape, wherein the retention portion comprises a bending portion disposed between the first contact portion and the second contact portion, wherein the bending portion forces the first contact portion and the second contact portion to frictionally retain the gap molding in the gap, and wherein the retention portion is coupled to the top portion at a terminal end of the Z shape.

17. The method of claim 16, further comprising removing the gap molding from the gap.

18. The method of claim 16, wherein, when the gap molding is inserted into the gap, the first contact portion contacts a first side of the gap at a first depth, and wherein the second contact portion contacts a second side of the gap different from the first side at a second depth different than the first depth.

19. The method of claim 16, wherein the top portion is silicone.

20. The method of claim 16, wherein the gap is located between an appliance and a countertop.

21. The method of claim 16, further comprising wiping the gap molding to remove accumulated debris.

22. The method of claim 16, further comprising cutting the gap molding to a length substantially the same as the length of the gap.

23. The method of claim 16, further comprising forming a trench in the top portion, wherein the trench is configured to capture debris from at least one of the first surface or the second surface.

* * * * *